UNITED STATES PATENT OFFICE.

COLIN G. FINK, OF SCHENECTADY, NEW YORK, ASSIGNOR TO GENERAL ELECTRIC COMPANY, A CORPORATION OF NEW YORK.

REDUCTION OF SILVER ORES.

1,013,931.  Specification of Letters Patent.  Patented Jan. 9, 1912.

No Drawing.   Application filed December 4, 1908.   Serial No. 465,932.

*To all whom it may concern:*

Be it known that I, COLIN G. FINK, a citizen of the United States, residing at Schenectady, county of Schenectady, State of New York, have invented certain new and useful Improvements in Reduction of Silver Ores, of which the following is specification.

My invention relates to the treatment of silver ores containing arsenic or antimony, together with other metallic elements which render very difficult the refining of these ores according to processes formerly in use. For example, if an ore of this character is subjected to a preliminary, open air roasting process, in order to remove the arsenic, a considerable amount of silver is lost by being volatilized with the arsenic. According to my invention, the yield in silver is not only increased; but an easy separation of the silver from the other metallic constituents of the ore, such as cobalt, nickel and iron, is obtained. I have discovered that when this class of ores are heated to the fusing temperature, either in an attenuated atmosphere or a reducing atmosphere, the greater part of the arsenic, or antimony, as the case may be, is distilled off as metallic arsenic or antimony, and the melted ore stratifies into three distinct layers: the lowermost layer being nearly pure silver with a small percentage of arsenic; the middle layer a speiss containing cobalt, nickel and iron, and the uppermost layer a slag, consisting chiefly of calcium silicate.

My process is especially applicable to the Nipissing silver ores from the region of Cobalt, Canada. A sample of this ore was found on analysis to contain 9.7% cobalt, 4.65% nickel, 28.65% arsenic, 18.06% silver; the remaining 39% consisting of iron, aluminum, calcium, silicon, antimony, and perhaps other elements.

The ore is preferably ground so as to pass through a forty mesh sieve. In some cases, carbon in the form of coke or charcoal is added to facilitate its decomposition. The amount of carbon added depends on the character of the ore. For instance, if oxids are present in considerable amount, more coke is added for their reduction. Its action is partly chemical, as a reducing agent, and partly physical, in so far as it keeps the charge porous, thus allowing the gases to escape readily. Should the gangue admixed with the ore be refractory, and its melting point be above or even near, the melting point of silver, fluxes are perfectly added. Their choice, of course, depends on the character of the gangue, a basic flux being added if the gangue is acidic, or the reverse, as is well understood by metallurgists. The charge is placed in a graphite or carbon crucible, or is introduced into a treating chamber through a hopper. If the ore is to be subjected to a vacuum treatment, the crucible filled with ore is placed in a furnace of the general principle of the Arsem furnace described in Patent No. 785,535 of 1905. The vacuum treatment is in some respects preferable, as the arsenic may be distilled off at a lower temperature than when heating the ore at atmospheric pressures. If desired, the ore can be heated in a reducing atmosphere, such as carbon monoxid gas or other reducing gas. A good separation can be obtained in this way at atmospheric pressure. In either case the ore is heated to a temperature of 1200–1500° C., and heating maintained at this temperature for two or three hours. By this treatment a greater part of the arsenic is volatilized as metallic arsenic, and the stratification of the fused ore into crude silver, speiss, and slag takes place, as already indicated. The volatilized arsenic passes out to a suitable condensing chamber.

If the ore has been heated in a crucible in a vacuum furnace, the furnace is allowed to cool down sufficiently to enable the removal of the crucible with its charge from the furnace. If desired, the silver may be mechanically separated from the speiss when solidified, or, the charge may be tapped off while melted, the silver being separated by taking advantage of its segregation. The metallic silver is then subjected to further treatment for the removal of the impurities present, consisting of iron, nickel, cobalt, and traces of arsenic. This may be done by distilling the silver from the impurities in a vacuum furnace of the Arsem type. The speiss may be subjected to further purification according to methods now in use, so as to remove the remaining arsenic and separate the metals as nickel and cobalt from each other.

What I claim as new and desire to secure by Letters Patent of the United States, is,—

1. The process of treating ores containing silver and arsenic, which consists in fusing said ores in an attenuated atmosphere, thereby distilling off the arsenic and allowing the silver to separate from the slag by gravity.

2. The process of treating a silver-bearing arsenic ore, which consists in heating said ore to fusing temperature in a vacuum and maintaining said ore fused until the crude silver separates by gravity.

3. The process of separating substantially pure silver from an arsenical silver ore which consists in fusing said ore out of contact with the atmosphere, distilling part of the arsenic, and allowing the silver to segregate from the rest of the charge while the charge is maintained fused.

4. The process of treating an ore containing silver, cobalt, nickel, a metalloid and earthy impurities which consists in heating said ore in an inert environment, thereby vaporizing most of the metalloid, and maintaining the residue in a state of fusion thereby causing segregation into distinct layers of respectively crude silver, a speiss containing cobalt and nickel and a slag.

5. The process which consists in heating a silver ore containing a metalloid in an inert environment at a temperature high enough to volatilize a large part of said metalloid and maintaining the residue of said ore in a state of fusion to produce segregation of the crude silver from the rest of the mass.

6. The process which consists in heating an arsenical silver ore in an inert environment thereby volatilizing arsenic and maintaining the residue in a state of fusion to assist the segregation of the crude silver from the rest of the reduction mass.

In witness whereof, I have hereunto set my hand this 1st day of December, 1908.

COLIN G. FINK.

Witnesses:
BENJAMIN B. HULL,
HELEN ORFORD.